No. 871,945. PATENTED NOV. 26, 1907.
R. M. MERRIMAN.
TIRE.
APPLICATION FILED MAR. 13, 1907.
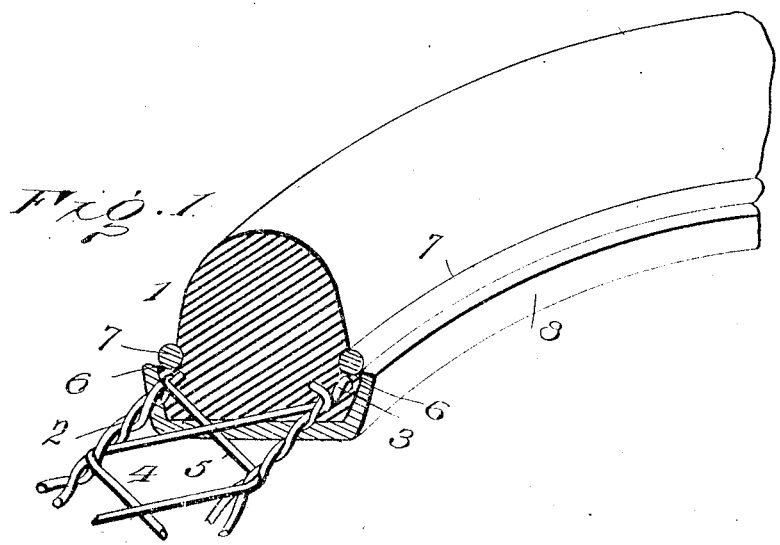
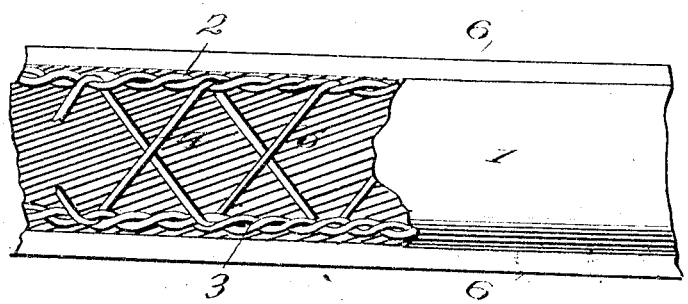

UNITED STATES PATENT OFFICE.

ROBERT M. MERRIMAN, OF YOUNGSTOWN, OHIO.

TIRE.

No. 871,945.  Specification of Letters Patent.  Patented Nov. 26, 1907.

Application filed March 13, 1907. Serial No. 362,168.

*To all whom it may concern:*

Be it known that I, ROBERT M. MERRIMAN, citizen of the United States, residing at Youngstown, in the county of Mahoning and State of Ohio, have invented certain new and useful Improvements in Tires, of which the following is a specification.

This invention appertains to tire structure for vehicles such as are equipped with soft tread or yieldable tires whether solid or cushion and which tires have metal reinforcements embedded therein to strengthen the tires linearly and assist materially in holding them to the rims of the vehicle wheels.

This invention contemplates a soft tread tire having side reinforcements embedded therein and connected by lacing which passes from one reinforcement to the other in a zig-zag or alternately oppositely inclined direction.

In the drawings hereto attached and forming a part of the specifications: Figure 1 is a perspective view of a portion of a vehicle channel iron and tire, the latter embodying the invention. Fig. 2 is a plan view of a portion of a tire embodying the invention, parts being broken away to show more clearly the construction of the reinforcement and the embedding of the same in the material of the tire.

The tire 1 may be of any construction, size or outline and is provided with reinforcements 2 and 3 at opposite sides and located in the base portion thereof. Each of the reinforcements 2 and 3 is composed of a number of wires twisted together, said reinforcements being embedded or molded in the tire. Lacings 4 and 5 connect the reinforcements 2 and 3. The lacings are preferably wire or metal strands, the latter being embedded or molded in the tire and passed backward and forward from one reinforcement 2 to the other reinforcement 3 and interlaced with said reinforcement by passing between the strands thereof. This construction insures the lacing maintaining a fixed position with reference to the reinforcements and guards against possible slipping. Outward displacement of the reinforcements is prevented by the lacing, and the latter making positive connection with the reinforcements and being embedded in the tire, prevents in a measure said reinforcements from cutting through the tire when the latter is in active service. By connecting the reinforcements in the manner disclosed, they mutually brace each other.

The tire illustrated is of the type having side extensions 6 which are adapted to be engaged by the binding wires 7 which hold the tire in the channel iron 8 fitted to the rim of the vehicle wheel. The reinforcements 2 and 3 are arranged within the side extensions 6; hence come below the respective binders 7 which are thereby prevented from cutting through the tire when the latter is subjected to strain incident to usage.

Having thus described the invention, what is claimed as new is:

1. In combination, a soft tread tire, metal reinforcements embedded in opposite sides thereof, each reinforcement consisting of a number of strands twisted together, and lacing embedded in the tire and connecting said reinforcements and passed between the strands thereof to maintain fixed position.

2. In combination, a soft tread tire having side extensions, metal reinforcements embedded in said side extensions, each reinforcement comprising a number of strands twisted together, and lacing connecting said metal reinforcements and passed between the strands thereof.

In testimony whereof I affix my signature in presence of two witnesses.

ROBERT M. MERRIMAN. [L. S.]

Witnesses.
  JOHN SCHLARB,
  W. C. MCKAIN.